US011669735B2

(12) United States Patent
Shaabana et al.

(10) Patent No.: US 11,669,735 B2
(45) Date of Patent: Jun. 6, 2023

(54) SYSTEM AND METHOD FOR AUTOMATICALLY GENERATING NEURAL NETWORKS FOR ANOMALY DETECTION IN LOG DATA FROM DISTRIBUTED SYSTEMS

(71) Applicant: VMware, Inc., Palo Alto, CA (US)

(72) Inventors: Ala Shaabana, Toronto (CA); Arvind Mohan, Raleigh, NC (US); Vikram Nair, Mountain View, CA (US); Anant Agarwal, San Jose, CA (US); Aalap Desai, Newark, CA (US); Ravi Kant Cherukupalli, San Ramon, CA (US); Pawan Saxena, Pleasanton, CA (US)

(73) Assignee: VMWARE, INC., Palo Alto, CA (US)

( * ) Notice: Subject to any disclaimer, the term of this patent is extended or adjusted under 35 U.S.C. 154(b) by 626 days.

(21) Appl. No.: 16/751,127

(22) Filed: Jan. 23, 2020

(65) Prior Publication Data
US 2021/0232906 A1 Jul. 29, 2021

(51) Int. Cl.
*G06N 3/08* (2023.01)
*G06F 11/14* (2006.01)
(Continued)

(52) U.S. Cl.
CPC ........... *G06N 3/08* (2013.01); *G06F 11/1476* (2013.01); *G06N 3/006* (2013.01); *G06N 3/044* (2023.01);
(Continued)

(58) Field of Classification Search
CPC .......... G06N 3/08; G06N 3/088; G06N 3/082; G06N 3/0445; G06N 3/0454; G06N 3/006;
(Continued)

(56) References Cited

U.S. PATENT DOCUMENTS

| 2018/0060721 A1* | 3/2018 | Kim ......................... G06N 3/08 |
| 2020/0302271 A1* | 9/2020 | Ovtcharov .............. G06F 7/483 |
| 2020/0380335 A1* | 12/2020 | Neznal ................ G06Q 10/067 |

OTHER PUBLICATIONS

Du, Min et al. "Deeplog: Anomaly detection and diagnosis from system logs through deep learning", In Proceedings of the 2017 ACM SIGSAC Conference on Computerand Communications Security. ACM, 2017, 14 pgs. (Year: 2017).*

(Continued)

*Primary Examiner* — Shane D Woolwine
(74) *Attorney, Agent, or Firm* — Loza & Loza, LLP

(57) ABSTRACT

A system and method for automatically generating recurrent neural networks for log anomaly detection uses a controller recurrent neural network that generates an output set of hyperparameters when an input set of controller parameters is applied to the controller recurrent neural network. The output set of hyperparameters is applied to a target recurrent neural network to produce a child recurrent neural network with an architecture that is defined by the output set of hyperparameters. The child recurrent neural network is then trained, and a log classification accuracy of the child recurrent neural network is computed. Using the log classification accuracy, at least one of the controller parameters used to generate the child recurrent neural network is adjusted to produce a different input set of controller parameters to be applied to the controller recurrent neural network so that a different child recurrent neural network for log anomaly detection can be generated.

20 Claims, 6 Drawing Sheets

(51) Int. Cl.
  *G06N 3/044* (2023.01)
  *G06N 3/045* (2023.01)
  *G06N 3/006* (2023.01)
  *G06N 3/088* (2023.01)
  *G06N 3/082* (2023.01)

(52) U.S. Cl.
  CPC .............. *G06N 3/045* (2023.01); *G06N 3/088* (2013.01); *G06N 3/082* (2013.01)

(58) Field of Classification Search
  CPC ........ G06N 20/00; G06N 20/10; G06N 20/20; G06N 3/044; G06N 3/045; G06N 3/0464; G06F 11/1476
  See application file for complete search history.

(56) References Cited

OTHER PUBLICATIONS

Olah, Christopher, "Understanding LSTM Networks", http://colah.github.io/posts/2015-08-Understanding-LSTMs/. (2015), Retrieved Aug. 12, 2022, 9 pgs. (Year: 2015).*

R. Vinayakumar, K. P. Soman and P. Poornachandran, "Long short-term memory based operation log anomaly detection," 2017 International Conference on Advances in Computing, Communications and Informatics (ICACCI), Udupi, India, 2017, pp. 236-242, doi: 10.1109/ICACCI.2017.8125846. (Year: 2017).*

Borchers, Oliver, "Fast Sentence Embeddings", https://github.com/oborchers/Fast_Sentence_Embeddings, 2019, 4 pgs.

Du, Min et al. "Deeplog: Anomaly detection and diagnosis from system logs through deep learning", In Proceedings of the 2017 ACM SIGSAC Conference on Computer and Communications Security. ACM, 2017, 14 pgs.

Hochreiter, Sepp et al. "Long short-term memory", Neural computation 9, 8 (1997), pp. 1735-1780.

Lu, Siyang et al. "Log-based abnormal task detection and root cause analysis for spark", In 2017 IEEE International Conference on Web Services (ICWS). IEEE, 8 pgs.

Lu, Siyang et al. "Detecting Anomaly in Big Data System Logs Using Convolutional Neural Network", In 2018 IEEE 16th Intl Conf on Dependable, Autonomic and Secure Computing, 16th Intl Conf on Pervasive Intelligence and Computing, 4th Intl Conf on Big Data Intelligence and Computing and Cyber Science and Technology Congress (DASC/PiCom/DataCom/CyberSciTech). IEEE, 8 pgs.

Mikolov, Tomas et al. "Efficient Estimation of Word Representations in VectorSpace", 2013, 12 pgs.

Olah, Christopher, "Understanding LSTM Networks", http://colah.github.io/posts/2015-08-Understanding-LSTMs/. (2015), Retrieved Jan. 21, 2018, 9 pgs.

Rose, Stuart et al."Automatic keyword extraction from individual documents", Text mining: applications and theory 1, 2010, 18 pgs.

Williams, Ronald J. Simple Statistical Gradient-Following Algorithms for Connectionist Reinforcement Learning. Machine Learning, 8, preprint 229-256 (1992).

Xu, Wei et al. "Detecting Large-Scale System Problems by Mining Console Logs", In Proceedings of the ACM SIGOPS 22nd symposium on Operating systems principles, 2009, ACM, pp. 117-132.

Zoph, Barrett et al. "Neural architecture search with reinforcement learning", 2016, 15 pgs.

* cited by examiner 2019-06-27 19:39:33.039 [mq-listener-52] ERROR [OpId:ee7c5294-e3ae-449b-a6b2-698ec9582b0c] [OrgType:CUSTOMER] [User:Internal-Operator] c.v.s.task.TaskExecutionService : Task XXXXXXX processStage exception
com.vmware.skyscraper.common.InternalSkyscraperException: Unable to obtain info.

FIG. 2A 2019-06-27 18:19:11.440 [mq-listener-53] INFO [OpId:ee7c5294-e3ae-449b-a6b2-698ec9582b0c] [OrgType:CUSTOMER] [User:Internal-Operator] c.v.s.autoscaler.ReplaceHostServiceImpl : Failed to determine state. Continuing to the next substage STAGE_2 for event Event: orgId= XXXXXX, userOrgType=CUSTOMER, sddcId=XXXXXX, clusterId= XXXXXX, esxId=XXXXX, property=STORAGE_DISK_OPERATIONAL_HEALTH, propertyValue=["red","green","green","red","red","red","green"], TaskType=Remediation

FIG. 2B 2019-06-27 19:43:20.318 [mq-listener-52] INFO [OpId:ee7c5294-e3ae-449b-a6b2-698ec9582b0c] [OrgType:CUSTOMER] [User:Internal-Operator] c.v.s.task.TaskExecutionService : Task {"user_id":"e05378ed-7c3d-3bfb-8129-9b5a554b8e50","user_name":"Internal-Operator","created":"2019-06-27T18:13:35.000139Z","version":95,"id":"12b21311-8756-4280-ba3d-58ffae4ece47","updated_by_user_id":"e05378ed-7c3d-3bfb-8129-9b5a554b8e50","updated_by_user_name":"Internal-Operator","updated":"2019-06-27T19:17:25.000000Z","status":"FAILED","resource_id":"00b2c079-06cb-48d2-bb6f-c30b949f481a","resource_type":"SDDC","start_resource_entity_version":null,"end_resource_entity_version":null,"parent_task_id":null,"parent_task_type":null,"parent_notifications":null,"sub_status":"STAGE_1","task_type":"TASK_1","error_message":"Exception: Unable to obtain info","localized_error_message":"Unable to obtain info","start_time":"2019-06-27T18:13:35.070000Z","end_time":"2019-06-27T19:43:20.253000Z","retries":0,"task_version":"20170226","progress_percent":0,"estimated_remaining_minutes":-1,"task_progress_phases":null,"task_sub_status_transitions":[{"old_sub_status":"STAGE_1","new_sub_status":"STAGE_2","transition_time":"2019-06-27T18:13:38.568Z"},{"old_sub_status":"STAGE_2","new_sub_status":"STAGE_3","transition_time":"2019-06-27T18:19:15.685Z"},{"old_sub_status":"STAGE_3","new_sub_status":"STAGE_4","transition_time":"2019-06-27T18:31:40.851Z"},{"old_sub_status":"STAGE_4","new_sub_status":"STAGE_5","transition_time":"2019-06-27T18:31:48.839Z"},{"old_sub_status":"STAGE_5","new_sub_status":"STAGE_6","transition_time":"2019-06-27T19:03:02.951Z"},{"old_sub_status":"STAGE_6","new_sub_status":"STAGE_7","transition_time":"2019-06-27T19:03:03.639Z"}],"service_errors":[],"task_error_details":[],"locale":"en_US","params":{"event":{"cluster_id":"c5086b3f-526d-4a7d-b476-eeda47efefa1","esx_id":"2a693ded-3ffb-484a-95a2-08290688303l","property":"STORAGE_DISK_OPERATIONAL_HEALTH","property_value":"[\"red\",\"green\",\"green\",\"red\",\"red\",\"red\",\"green\"]","org_id":"XXXX","sddc_id":"XXXX","task_type":"Remediation","use r_org_type":"CUSTOMER","esx_host_name":"XXXX"},"SUBTASK_RETRY_COUNT":3,"deploymentType":"SINGLE_AZ","wasAwsInstanceTerminated":false,"failedHostInstanceId":"XXXXX","wasHostPsod":false,"failedHostEsxHostName":"XXXXX","wasTransient":false,"esxProvisionedHostIds":"XXXXXX","esxHostToDeleteId":"XXXXXX","hostUpPostReboot":false,"triggerNewActionOrRetry":false,"addHostTaskId":"XXXXXX","esxHostTags":[],"deleteHostTaskId":"XXXXX"},"org_type":"CUSTOMER","created_build_number":0,"correlation_id":null,"receiver_ids":[],"phase_in_progress":"","org_id":"XXXX"} failed with errorCodes:[MissingErrorCode] and failed components:[MissingComponent]

FIG. 2C

SYSTEM AND METHOD FOR AUTOMATICALLY GENERATING NEURAL NETWORKS FOR ANOMALY DETECTION IN LOG DATA FROM DISTRIBUTED SYSTEMS

BACKGROUND

Log data has been widely employed to ensure the reliability of distributed systems because logs are often the only data available that records system runtime information. Compared with logs generated by traditional standalone systems, distributed system logs are often an amalgamation of different services combined together into a single ledger. This makes triaging system errors in real time a rather difficult and time-consuming problem, requiring expert knowledge in the system being investigated to determine root-cause issues.

Indeed, past works have focused on creating pattern recognition algorithms and using natural language processing to understand the context of a log and its reasoning. However, this creates a dependency on developers to write informative logs. This is not a reasonable dependency as there is no standard today for logging errors and system information. The research community then began focusing on creating predictive algorithms that take into account the timing of the logs and their sequence relative to the time of failure and the log indicating the failure. However, this also requires great domain knowledge of both pattern recognition and the underlying hyper-converged infrastructure. In addition, in the presence of many microservices running simultaneously, a new pattern recognition model must be trained for each service's logs.

SUMMARY

A system and method for automatically generating recurrent neural networks for log anomaly detection uses a controller recurrent neural network that generates an output set of hyperparameters when an input set of controller parameters is applied to the controller recurrent neural network. The output set of hyperparameters is applied to an untrained recurrent neural network to produce a new, trained child recurrent neural network with an architecture that is defined by the output set of hyperparameters of the controller neural network. The child recurrent neural network is then re-trained, and a log classification accuracy of the child recurrent neural network is computed. Using the log classification accuracy as an indicator of the performance of the child recurrent neural network, the controller neural network re-adjusts its own parameters and then continuously re-trains the child recurrent neural network to obtain a higher classification accuracy.

A computer-implemented method for automatically generating recurrent neural networks for log anomaly detection in accordance with an embodiment of the invention comprises creating a training dataset of logs and a validation dataset of logs, wherein the logs in the training and validation datasets relate to operations of at least one component running in a computing environment; for each input set of controller parameters that is applied to a controller recurrent neural network: generating an output set of hyperparameters at the controller recurrent neural network; applying the output set of hyperparameters to a target recurrent neural network to produce a child recurrent neural network for log anomaly detection with an architecture that is defined by the output set of hyperparameters; training the child recurrent neural network using the training dataset of logs to classify each of the logs as one of an anomalous log and a non-anomalous log; and computing a log classification accuracy of the child recurrent neural network with respect to correct classification of anomalous logs and non-anomalous logs using the validation dataset of logs; and using a current log classification accuracy of a corresponding child recurrent neural network, adjusting at least one of the controller parameters used to generate the corresponding child recurrent neural network to produce a different input set of controller parameters to be applied to the controller recurrent neural network so that a different child recurrent neural network for log anomaly detection with a different architecture can be generated. In some embodiments, the steps of this method are performed when program instructions contained in a non-transitory computer-readable storage medium are executed by one or more processors.

A system for automatically generating recurrent neural networks for log anomaly detection in accordance with an embodiment of the invention comprises memory and at least one processor configured to create a training dataset of logs and a validation dataset of logs, wherein the logs in the training and validation datasets relate to operations of at least one component running in a computing environment; for each input set of controller parameters that is applied to a controller recurrent neural network: generate an output set of hyperparameters at the controller recurrent neural network; apply the output set of hyperparameters to a target recurrent neural network to produce a child recurrent neural network for log anomaly detection with an architecture that is defined by the output set of hyperparameters; train the child recurrent neural network using the training dataset of logs to classify each of the logs as one of an anomalous log and a non-anomalous log; and compute a log classification accuracy of the child recurrent neural network with respect to correct classification of anomalous logs and non-anomalous logs using the validation dataset of logs; and using a current log classification accuracy of a corresponding child recurrent neural network, adjust at least one of the controller parameters used to generate the corresponding child recurrent neural network to produce a different input set of controller parameters to be applied to the controller recurrent neural network so that a different child recurrent neural network for log anomaly detection with a different architecture can be generated.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 2A is an example of a log with an obvious keyword "ERROR" for anomaly detection.

FIG. 2B is an example of a log without an obvious keyword for anomaly detection.

FIG. 2C is an example of a log with an anomaly-indicating keyword hidden in a large log body.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
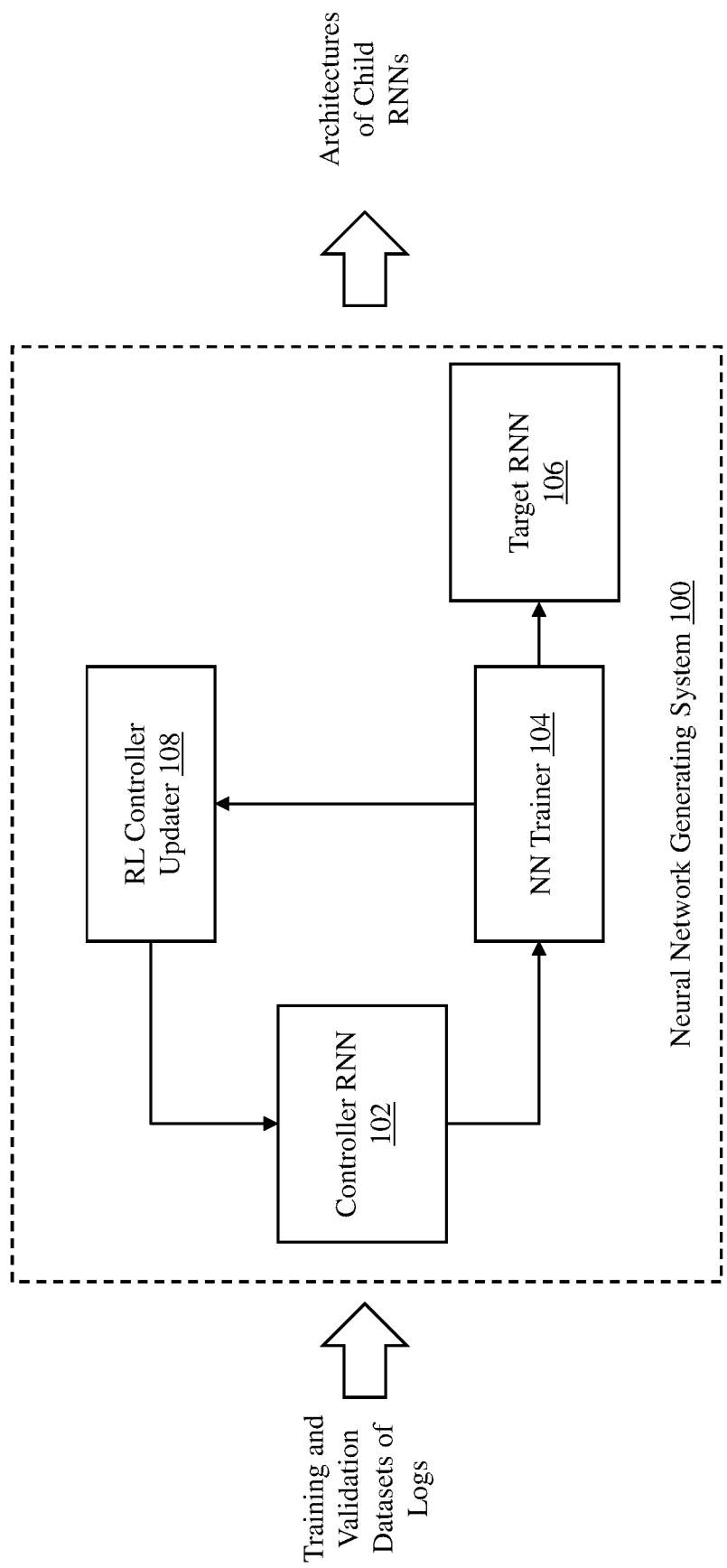
FIG. 1 is a block diagram of a neural network generating system in accordance with an embodiment of the invention.

FIG. 1 shows a system 100 for automatically generating neural networks for detecting anomalies in logs from various network components or systems, which may be physical or virtual, running in a computing environment, such as a on-premise data center or a cloud computing environment, in accordance with an embodiment of the invention. As used herein, a log is a record of an event/activity by a computing system. Logs are used to identify the behavior/state of a system so as to determine if its functioning according to its predefined characteristics. An anomalous log is a log that could lead to or describe a failure in the source network component/system or shows significant unexpected order in context (e.g., a component repeatedly trying to restart before it stops working or times out). As explained below, the neural network generating system 100 uses a recurrent neural network to automatically generate child recurrent neural networks for anomalous log detection that does not require developers to write informative logs and also does not require the assistance of neural network designers with great domain knowledge of both pattern recognition and the underlying hyper-converged infrastructure.

Logs can vary in length and content, as illustrated in FIGS. 2A, 2B and 2C. As illustrated in FIG. 2A, a log can be relatively short and may contain one or more keywords, which can indicate that the log is an anomalous log. In the example shown in FIG. 2A, the log contains a keyword "ERROR", which indicates that the log contains an erroneous entry. However, as illustrated in FIG. 2B, a log may not include one or more obvious keywords, which can indicate that the log is an anomalous log. In addition, as illustrated in FIG. 2C, a log can be too long to manually go through to search for keywords or context, which can indicate that the log is an anomalous log. Most logs are similar to the example shown in FIG. 2C.

Thus, classifying logs as either anomalous logs or non-anomalous log is a challenging task. As illustrated in the example shown in FIG. 2B, anomalous logs cannot always be identified by one or more anomaly-indicating keywords such as "ERROR". As illustrated in the example shown in FIG. 2C, anomaly-indicating keywords can be hidden anywhere in a large log body, which may be a difficult and time-consuming search process. In addition, domain knowledge may be needed to understand the contents contained in many logs. Therefore, a machine learning classifier that goes through a vast number of logs and classifies anomalous and non-anomalous logs may be helpful.

Figure 3:
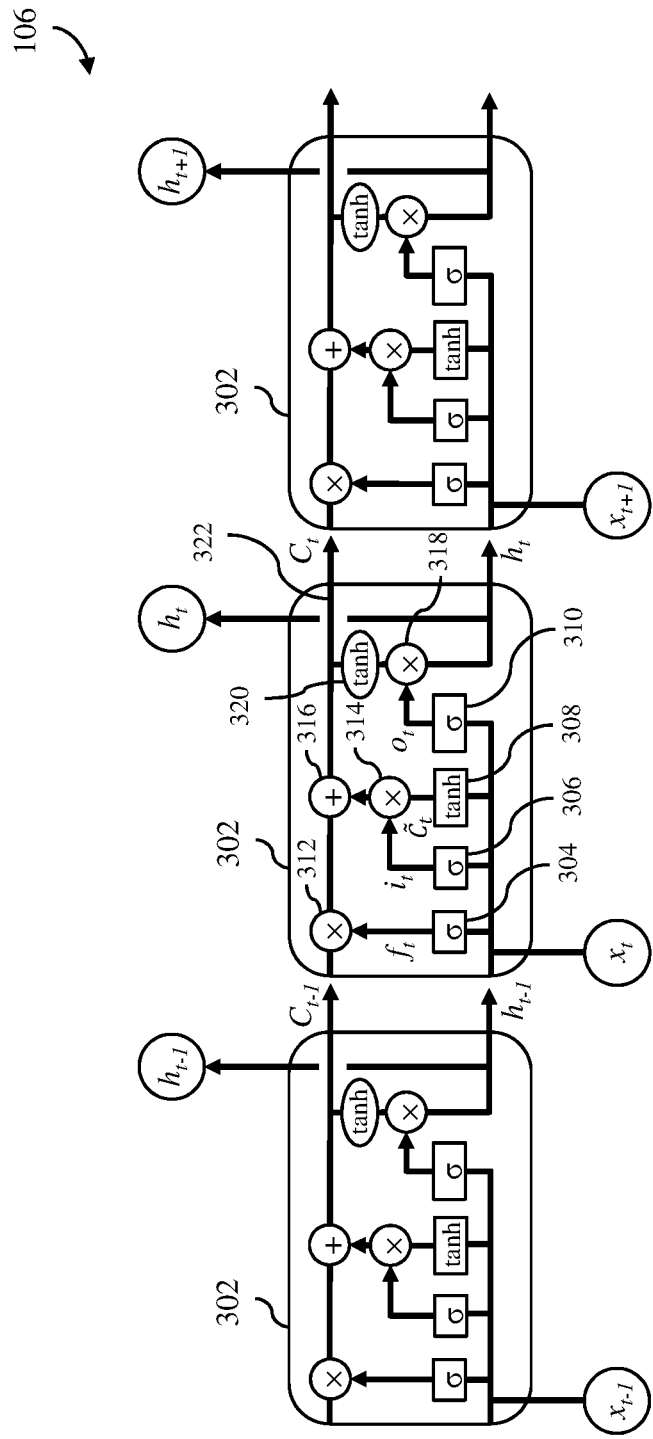
FIG. 3 is a block diagram of a target recurrent neural network in the neural network generating system in accordance with an embodiment of the invention.

One machine learning classifier that can be used for log classification is a recurrent neural network (RNN) classifier that is trained on an input dataset provided by a user. Unlike traditional or feedforward neural networks with fixed inputs and outputs, RNNs can store context and use that stored information for subsequent processes. Humans do not start their thinking from scratch every second. In fact, humans think in chains, based on their understanding of previous data whether it is visual, auditory, olfactory or tactile. Traditional or feedforward neural networks cannot do this. Instead, these traditional neural networks are very good at differentiating between targets at a given point in time t. However, the traditional neural networks are not capable of taking information into account from a previous point in time t−1. RNNs address this issue by allowing information to persist. A cell of an RNN looks at some input $x_t$ and outputs a value $h_t$. As illustrated in FIG. 3, the RNN cell uses a feedback loop that allows information to be passed from one step of the network to the next.

The problem of long term dependencies lies in short-term applications. For example, consider the problem of classifying logs in which we are trying to predict the next word based on the previous ones. For a log that states "adding host to cluster", if we are trying to predict the word "cluster" in the log, then we do not need any further context. It is obvious the next word after "to" will be "cluster" as hosts are always added to clusters. In such cases, where the gap between relevant information and the place that it is needed is small, RNNs learn to use the past information. However, let's use a different example where we are trying to predict the last word in the text "Adding host in cluster . . . failure in cluster". Recent information suggests that the next word is probably an entity like "cluster" or "hyper converged infrastructure (HCI)". However, if we wish to narrow down where the failure happened, we will need to go back further to the "adding a host" part. As this gap between information widens, RNNs become unable to learn to connect the information. Indeed, for predicting logs in massive log datasets where the failure-causing log could be far away from the actual failure log, this becomes problematic.

Long Short Term Memory Networks (LSTMs) are a special kind of RNN capable of learning long-term dependencies and explicitly designed to avoid the long-term dependency problem. All RNNs have the form of a chain of repeating modules of neural networks. In standard RNNs, this repeating module has a very simple structure, such as a single activation layer. In LSTMs, however, each repeating module in the chain has four layers in which each layer interacts in a different way.

Thus, an LSTM classifier can be used as a log classifier. However, building an LSTM classifier to automatically classify logs into groups of anomalous logs and non-anomalous logs is labor intensive. Let's take an example of creating an LSTM classifier for logs from a dynamic scaling service in a virtual private cloud running on a public cloud infrastructure. The dynamic scaling service can hypothetically have the capability of remediating host failures, adding/removing hosts from the private cloud causing the service to generate large amounts of logs. Each log is converted into a vectorized log, which includes a vector representation of the log or message included in the log, a timestamp and information about the component that generated the log. Each vectorized log is a vector of 110 real numbers. The LSTM classifier built is a simple single-layer LSTM-based model, where the layer has 200 units or artificial neurons. This LSTM classifier achieved about 78 percent accuracy for classifying logs into either anomalous logs or non-anomalous logs.

While the LSTM classifier performed reasonably, it took approximately 6 hours to build. In addition, manual hyperparameter tuning, which involves deciding on the number of layers, the number of units per layer, batch size, etc., was difficult and time consuming. Furthermore, building the LSTM classifier required extensive machine learning domain knowledge. But, most importantly, this particular LSTM classifier was built to specifically work on a dynamic scaling service logs. Thus, unfortunately, this LSTM classifier will not work for logs from other components of the hyper converged infrastructure (HCI), such as VMware vSphere® High Availability (HA) and VMware vSphere® Distributed Resource Scheduler™ (DRS) components. As such, new LSTM classifiers would have to be built for these different types of logs from other components.

The neural network generating system 100 addresses these challenges by automatically creating neural networks for anomalous log detection, which can then be used to classify whether logs are anomalous or nonanomalous. As described in more detail below, the neural network generating system 100 uses one RNN to generate model descriptions of child neural networks and train these child neural networks with reinforcement learning to maximize the expected accuracy of the generated architectures on a validation set. Since the child neural networks are created automatically, the neural network creation process executed by the neural network generating system 100 does not require persons with extensive machine learning domain knowledge. In addition, the neural network creation process executed by the neural network generating system 100 can create new child neural networks significantly faster than conventional manual neural creation processes. Thus, the neural network generating system 100 can be used to more easily create new neural networks for anomalous log detection.

As shown in FIG. 1, the neural network generating system 100 includes a controller RNN 102, an NN trainer 104, a target RNN 106 and a reinforced learning (RL) controller updater 108. The neural network generating system 100 may be implemented as hardware, software or combination of both. In a particular embodiment, the neural network generating system 100 is implemented as software running on one or more physical computer systems with memory, one or more processors and other components commonly found in typical computers.

The neural network generating system 100 operates on training and validation datasets of log for training and validating architectures of newly created child RNNs that are configured to classify input logs as either anomalous or non-anomalous logs. An architecture of an RNN is defined by hyperparameters, which sets various configurations of the RNN, such as the number of layers in the RNN, the operations performed by each of the layers in the RNN and the connectivity between the layers in the RNN with respect to their inputs and outputs. Thus, by changing one or more hyperparameters, different RNNs can be created.

The controller RNN 102 is a neural network that is controlled by controller parameters to generate a set of hyperparameters, which can be used to define the architecture of a new child RNN. The set of hyperparameters generated by the controller RNN 102 will change as different controller parameters are provided to the controller RNN. These controller parameters may include, but not limited to, the number of hidden layers, the number of neurons per layer, the learning rate, the dropout percentage, the percentage of neuron pruning, and percentage of weight pruning. Each output set of hyperparameters includes each output at each of multiple time steps performed by the controller RNN 102 that corresponds to a particular hyperparameter. The values of the hyperparameters in a unique set of hyperparameters define an architecture for a unique child RNN.

The NN trainer 104 operates to receive each set of hyperparameters from the controller RNN 102 and uses the values of the hyperparameters to configure the target RNN into an RNN architecture defined by the hyperparameters to produce a child RNN for log anomaly detection. The NN trainer 104 then trains the resulting child RNN using the training dataset of logs and then evaluates the performance of the child RNN using the validation dataset of logs to determine the accuracy of the child RNN to correctly classify logs as anomalous logs or non-anomalous logs. In an embodiment, the performance of the child RNN is evaluated by computing the percentage of correct classification of logs from all the log classifications.

The RL controller updater 108 operates to update the controller parameters based on the performance evaluation of the current child RNN, which is provided by the NN trainer 104. In an embodiment, the RL controller updater 108 uses a reinforced learning algorithm to maximize an expected reward, which in this case is the accuracy of the candidate RNN to detect anomalous logs. Thus, the RL controller updater 108 uses a goal of maximizing the accuracy of child RNN results by repeatedly adjusting controller parameters, which in turn will modify or adjust the sets of hyperparameters that will be used to create new child RNNs with greater accuracy with respect to anomalous log detection.

The target RNN 106 is a neural network that can be configured using a set of hyperparameters that is generated by the controller RNN 102. Thus, the target RNN 106 can be used to create child RNNs of different architectures by using different sets of hyperparameters from the controller RNN 102. In an embodiment, the target RNN 106 is an LSTM RNN with LSTM cells, as illustrated in FIG. 3.

FIG. 3 shows the target RNN 106 with LSTM units or cells 302, which are connected to each other. The LSTM cells 302 are identical except for input and output values. Thus, only one of the LSTM cells 302 is illustrated in detail in FIG. 3. As shown in FIG. 3, each LSTM cell 302 includes four neural network layers 304-310 and five pointwise operation modules 312-320, which operate on a horizontal line 322 that carries the cell state from one LSTM cell to the next. The four neural network layers include sigmoid layers 304, 306 and 310, and a tanh layer 308. The arrows shown in the LSTM cell are vector transfers with arrows that merge representing concatenate operations and arrows that fork into two arrows presenting copy operations.

The sigmoid layer 304, which is called the "forget layer", receives inputs $x_t$ and $h_{t-1}$ and outputs $f_t$, or function f at time t, which decides which pieces of information to discard. The output $f_t$ is expressed as: $f_t=\sigma(W_f\cdot[h_{t-1},x_t]+b_f)$, where $W_f$ is a specified weight for the layer, $h_{t-1}$ is the value of the previous cell, $x_t$ is the input at time t, and $b_f$ is the bias term.

The sigmoid layer 306, which is called the "input layer", receives inputs $x_t$ and $h_{t-1}$ and outputs $i_t$, or function i at time t, which decides which values to update and which to leave. The output $i_t$ is expressed as: $i_t=\sigma(W_i\cdot[h_{t-1},x_t]+b_i)$.

The tanh layer 308 receives inputs $x_t$ and $h_{t-1}$ and outputs $\tilde{C}_t$, which is the "new" state $\tilde{C}$ at time t that contains a vector of new candidate values that could be added to the state. The output $\tilde{C}_t$ is expressed as: $\tilde{C}_t=\tanh(W_C\cdot[h_{t-1},x_t]+b_C)$.

The pointwise operation module 312 multiplies the previous cell state $C_{t-1}$ with $f_t$. In addition, the pointwise operation module 316 adds $i_t*\tilde{C}_t$, which is generated by the pointwise operation module 314 that multiples $i_t$ and $\tilde{C}_t$. The result of these operations is the updated state $C_t$ of the LSTM cell. Thus, the state $C_t$ of the LSTM cell is updated by integrating information of the older cell $C_{t-1}$ into it using the forget layer $f_t$, the input layer $i_t$, and the new candidate values C. The updated state $\tilde{C}_t$ of the LSTM cell is expressed as: $C_t=f_t*C_{t-1}+i_t*\tilde{C}_t$.

The sigmoid layer 310 decides which parts of the cell state are going to be the output of the LSTM cell. In particular, the sigmoid layer 310 receives inputs $x_t$ and $h_{t-1}$ and outputs $o_t$, or function o at time t. The output $o_t$ is expressed as: $o_t=\sigma(W_o\cdot[h_{t-1},x_t]+b_o)$.

The tanh module 320 receives the updated state $\tilde{C}_t$ of the LSTM cell and outputs $\tanh(C_t)$ in order to push the values between −1 and 1. The output $\tanh(C_t)$ is then multiplied with the output $o_t$ of the sigmoid layer 310 by the pointwise operation module 318 to produce the output $h_t$, which includes only the parts that one wishes to produce. The output $h_t$ is expressed as: $h_t=o_t*\tanh(C_t)$.

In all, the computations for basic LSTM cells can be generalized as a tree of steps that take $x_t$ and $h_{t-1}$ as inputs and produce $h_t$ as final output. The controller RNN 102 needs to label each node in the tree with a combination method (addition, elementwise, multiplication, etc.) and an activation function (tanh, sigmoid, rectifier linear unit (ReLU), etc.) to merge two inputs and produce one output. Two outputs from two nodes on the same tree level are then fed as inputs to the next node in the tree. To allow the controller RNN 102 to select these methods and functions, the nodes in the tree are indexed in an order so that the controller RNN can visit each node one by one and label the required hyperparameters.

In an embodiment, the controller RNN 102 may also include LSTM cells similar to the LSTM cells 302 illustrated in FIG. 3 with some differences. The main difference is that each node (i.e., neuron) in a given layer of the controller RNN 102 is connected with a directed (one-way connection, as opposed to a two-way connection with the LSTM RNN) to every other node in the next successive layer. Each node of the controller RNN 102 has a time-varying real-valued activation (i.e., the tanh activation function). Each connection has a modifiable real-valued weight. Nodes of the controller RNN 102 are either input nodes (receiving data from outside the network), output nodes (yielding results), or hidden nodes (that modify the data en route from input to output).

Sequences of real-valued input vectors arrive at the input nodes, which for the neural network generating system 100 are the hyperparameters of the LSTM RNN that achieve a given accuracy at a given time. At any given time step, each non-input unit computes its current activation (result) as a nonlinear function of the weighted sum of the activations of all units that connect to it.

Figure 4:
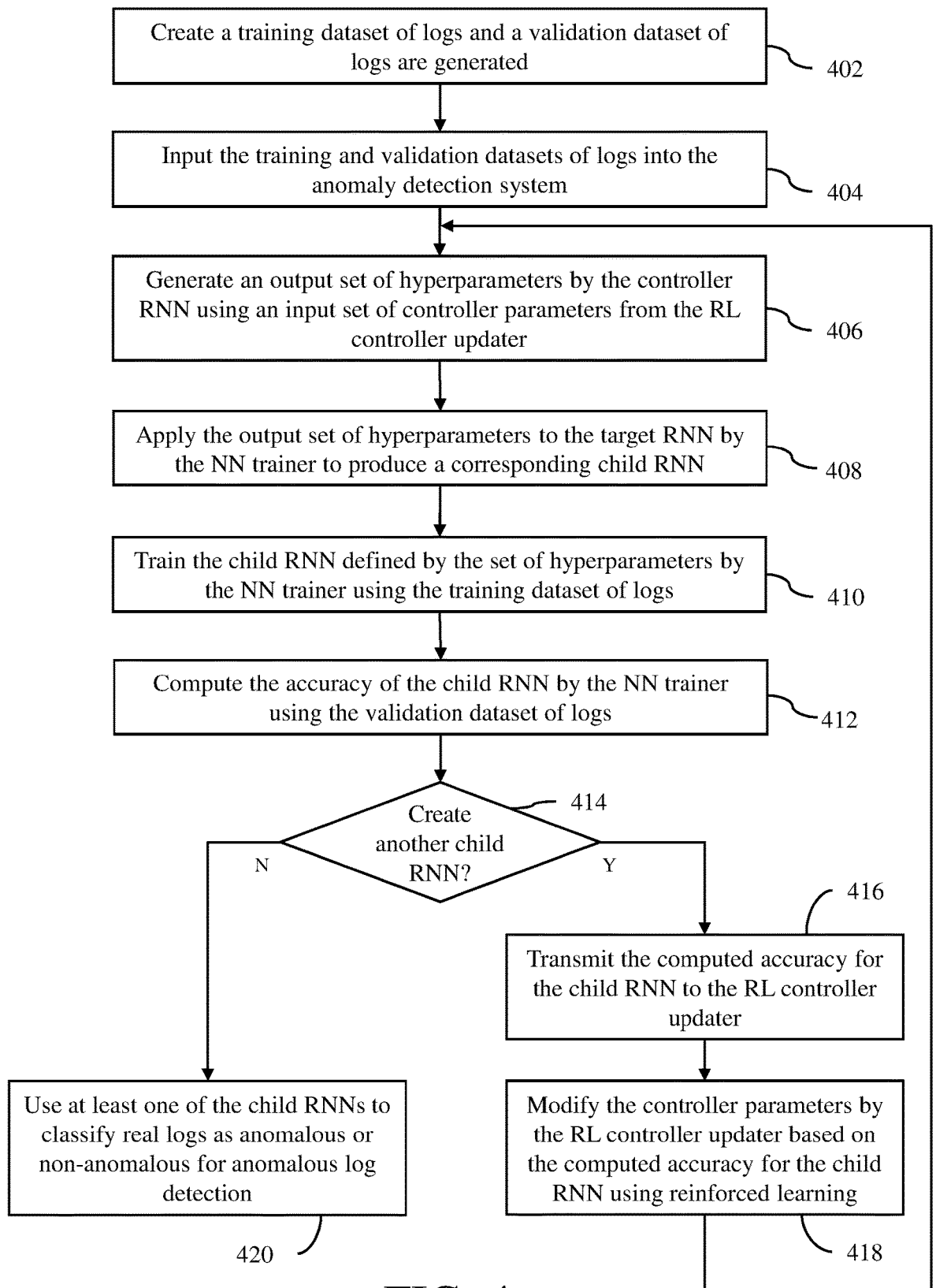
FIG. 4 is a process flow diagram of a process of using the neural network generating system to generate child recurrent neural networks (RNNs) for anomalous log detection in accordance with an embodiment of the invention.

A process of using the neural network generating system 100 to generate child RNNs for anomalous log detection in accordance with an embodiment of the invention is now described with reference to a process flow diagram of FIG. 4. At block 402, a training dataset of logs and a validation dataset of logs are created. In an embodiment, these datasets of logs may be generated from logs related to one or more network components or systems, which may be physical or virtual, running in a computing environment, such as a on-premise data center or a cloud computing environment. In a particular implementation, each log may be converted into a vectorized log, which includes a vector representation of the log or message included in the log, a timestamp and information about the component that generated the log, as well as an indication of whether the log is anomalous or non-anomalous. As an example, each vectorized log may be a vector of 110 real numbers. Some of the logs are used for the training dataset of logs, and some of the logs are used for the validation dataset of logs. As an example, 80% of the logs are used to create the training dataset of logs, and 20% of the logs are used to create the validation dataset of logs.

Next, at block 404, the training and validation datasets of logs are inputted into the neural network generating system 100 to generate new RNNs for anomalous log detection, which are designed to work on the types of logs used in the training and validation datasets.

Next, at block 406, an output set of hyperparameters is generated by the controller RNN 102 using an input set of controller parameters from the RL controller updater 108. The output set of hyperparameters that is generated by the controller RNN 102 will depend on the particular controller parameters that are applied to the controller RNN. Thus, if one or more controller parameters are modified in the input set of controller parameters, the hyperparameters in the output set will also be modified or changed. Since a particular set of hyperparameters defines a unique architecture for a new child RNN, changing the controller parameters in the input set will change the architecture for the new child RNN due to the different set of hyperparameters that will be generated by the controller RNN 102.

Next, at block 408, the output set of hyperparameters is applied to the target RNN 106 by the NN trainer 104 to produce a corresponding child RNN, which is a child RNN with an architecture defined by the applied set of hyperparameters.

Next, at block 410, the child RNN defined by the set of hyperparameters is trained by the NN trainer 104 using the training dataset of logs. In particular, the child RNN is trained using the training dataset of logs to learn to classify logs as anomalous or non-anomalous.

Next, at block 412, the accuracy of the child RNN is computed by the NN trainer 104 using the validation dataset of logs. In an embodiment, the accuracy is computed as the percentage of correct classifications of logs as either anomalous or non-anomalous from all the log classifications that are determined by the child RNN.

Next, at block 414, a determination is made by the NN trainer 104 whether another child RNN needs to be created. In an embodiment, this determination may be made based on a predefined number of child RNN to be created. Once this predefined number of child RNN has been reached, no additional child RNN needs to be created. If the determination is yes, then the process proceeds to block 416 so that another child RNN can be created. However, if the determination is no, then the process proceeds to block 420.

At block 416, the computed accuracy for the child RNN is transmitted to the RL controller updater 108 from the NN trainer 104.

Next, at block 418, the controller parameters are modified by the RL controller updater 108 based on the computed accuracy for the child RNN using reinforced learning. The controller parameters may be modified or adjusted for one or more of the controller parameters so that the reward, i.e., the log classification accuracy, is improved for the next iteration. The process then proceeds back to block 406 so that another child RNN can be created using the new set of controller parameters for the controller RNN 102.

At block 420, at least one of the child RNNs is used to classify real logs as anomalous or non-anomalous for anomalous log detection. In an embodiment, these classifications may be used to troubleshoot issues in one or more network components or systems, which may be the sources of the anomalous logs.

Experiments show that an RNN for log classification with about 78% accuracy can be created manually in about 6 hours. In contrast, an RNN for log classification with about 77% accuracy can be created by the neural network generating system 100 in about 30 minutes.

Figure 5:
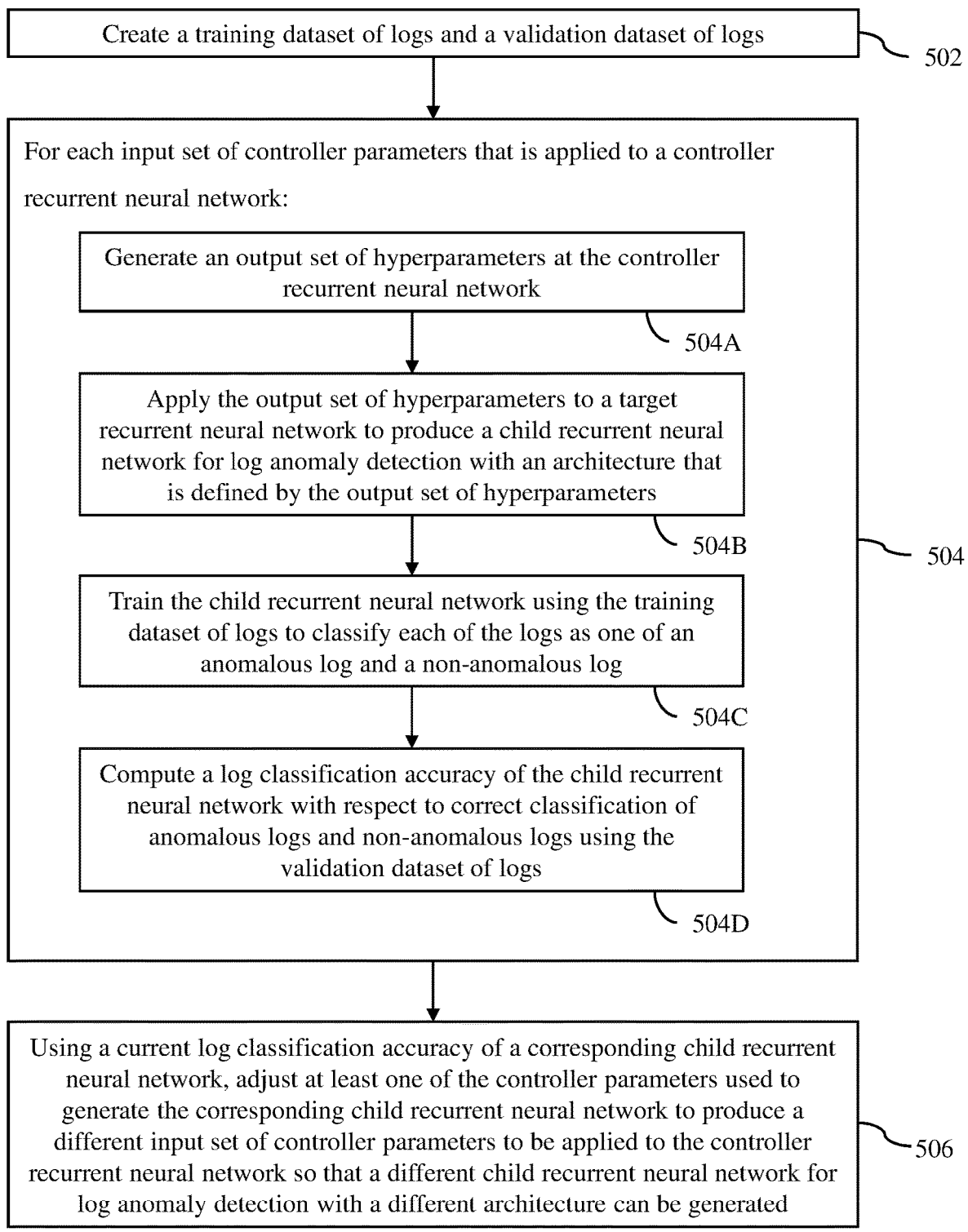
FIG. 5 is a flow diagram of a computer-implemented method for automatically generating recurrent neural networks for log anomaly detection in accordance with an embodiment of the invention.

A computer-implemented method for automatically generating recurrent neural networks for log anomaly detection in accordance with an embodiment of the invention is described with reference to a flow diagram of FIG. 5. At block 502, a training dataset of logs and a validation dataset of logs are created. The logs in the training and validation datasets relate to operations of at least one component running in a computing environment. At block 504, for each input set of controller parameters that is applied to a controller recurrent neural network, sub-blocks 504A, 504B, 504C and 504D are performed. At sub-block 504A, an output set of hyperparameters is generated at the controller recurrent neural network. At sub-block 504B, the output set of hyperparameters is applied to a target recurrent neural network to produce a child recurrent neural network for log anomaly detection with an architecture that is defined by the output set of hyperparameters. At sub-block 504C, the child recurrent neural network is trained using the training dataset of logs to classify each of the logs as one of an anomalous log and a non-anomalous log. At sub-block 504D, a log classification accuracy of the child recurrent neural network with respect to correct classification of anomalous logs and non-anomalous logs is computed using the validation dataset of logs. At block 506, using a current log classification accuracy of a corresponding child recurrent neural network, at least one of the controller parameters used to generate the corresponding child recurrent neural network is adjusted to produce a different input set of controller parameters to be applied to the controller recurrent neural network so that a different child recurrent neural network for log anomaly detection with a different architecture can be generated.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for automatically generating recurrent neural networks for log anomaly detection, the method comprising:

creating a training dataset of logs and a validation dataset of logs, wherein the logs in the training and validation datasets relate to operations of at least one component running in a computing environment;
for each input set of controller parameters that is applied to a controller recurrent neural network:
generating an output set of hyperparameters at the controller recurrent neural network;
applying the output set of hyperparameters to a target recurrent neural network to produce a child recurrent neural network for log anomaly detection with an architecture that is defined by the output set of hyperparameters;
training the child recurrent neural network using the training dataset of logs to classify each of the logs as one of an anomalous log and a non-anomalous log; and
computing a log classification accuracy of the child recurrent neural network with respect to correct classification of anomalous logs and non-anomalous logs using the validation dataset of logs; and
using a current log classification accuracy of a corresponding child recurrent neural network, adjusting at least one of the controller parameters used to generate the corresponding child recurrent neural network to produce a different input set of controller parameters to be applied to the controller recurrent neural network so that a different child recurrent neural network for log anomaly detection with a different architecture can be generated,
wherein the child recurrent neural network is a long short term memory (LSTM) recurrent neural network that includes first LSTM cells and wherein the controller recurrent neural network is a LSTM recurrent neural network that includes second LSTM cells.

2. The method of claim 1, wherein the logs in the training and validation datasets relate to operations of a software process running in a cloud computing environment.

3. The method of claim 1, wherein each node in a layer of the controller recurrent neural network is connected with a directed one-way connection to every other node in the next successive layer instead of a two-way connection.

4. The method of claim 1, wherein the hyperparameters include at least learning rate, batch size, number of layers and number of long short term memory (LSTM) units per layer.

5. The method of claim 1, wherein each LSTM cell of the target recurrent neural network includes four interacting layers.

6. The method of claim 5, wherein an output $h_t$ of each LSTM cell is computed using $f_t$ generated by a first sigmoid layer, $i_t$ generated by a second sigmoid layer, $\tilde{C}_t$ generated by a tanh layer and $o_t$ generated by a third sigmoid layer, where $f_t$, $i_t$, $\tilde{C}_t$ and $o_t$ are functions.

7. The method of claim 1, wherein computing the log classification accuracy of the child recurrent neural network includes computing a percentage of correct classification of logs from the total number of logs that are classified.

8. A non-transitory computer-readable storage medium containing program instructions for method for automatically generating recurrent neural networks for log anomaly detection, wherein execution of the program instructions by one or more processors of a computer system causes the one or more processors to perform steps comprising:
creating a training dataset of logs and a validation dataset of logs, wherein the logs in the training and validation datasets relate to operations of at least one component running in a computing environment;
for each input set of controller parameters that is applied to a controller recurrent neural network:
generating an output set of hyperparameters at the controller recurrent neural network;
applying the output set of hyperparameters to a target recurrent neural network to produce a child recurrent neural network for log anomaly detection with an architecture that is defined by the output set of hyperparameters;
training the child recurrent neural network using the training dataset of logs to classify each of the logs as one of an anomalous log and a non-anomalous log; and
computing a log classification accuracy of the child recurrent neural network with respect to correct classification of anomalous logs and non-anomalous logs using the validation dataset of logs; and
using a current log classification accuracy of a corresponding child recurrent neural network, adjusting at least one of the controller parameters used to generate the corresponding child recurrent neural network to produce a different input set of controller parameters to be applied to the controller recurrent neural network so that a different child recurrent neural network for log anomaly detection with a different architecture can be generated,
wherein the child recurrent neural network is a long short term memory (LSTM) recurrent neural network that includes first LSTM cells and wherein the controller recurrent neural network is a LSTM recurrent neural network that includes second LSTM cells.

9. The computer-readable storage medium of claim 8, wherein the logs in the training and validation datasets relate to operations of a software process running in a cloud computing environment.

10. The computer-readable storage medium of claim 8, wherein each node in a layer of the controller recurrent neural network is connected with a directed one-way connection to every other node in the next successive layer instead of a two-way connection.

11. The computer-readable storage medium of claim 8, wherein the hyperparameters include at least learning rate, batch size, number of layers and number of long short term memory (LSTM) units per layer.

12. The computer-readable storage medium of claim 8, wherein each LSTM cell of the target recurrent neural network includes four interacting layers.

13. The computer-readable storage medium of claim 12, wherein an output $h_t$ of each LSTM cell is computed using $f_t$ generated by a first sigmoid layer, $i_t$ generated by a second sigmoid layer, $\tilde{C}_t$ generated by a tanh layer and $o_t$ generated by a third sigmoid layer, where $f_t$, $i_t$, $\tilde{C}_t$ and $o_t$ are functions.

14. The computer-readable storage medium of claim 8, wherein computing the log classification accuracy of the child recurrent neural network includes computing a percentage of correct classification of logs from the total number of logs that are classified.

15. A system for automatically generating recurrent neural networks for log anomaly detection, the system comprising:
memory; and
at least one processor configured to:
create a training dataset of logs and a validation dataset of logs, wherein the logs in the training and validation datasets relate to operations of at least one component running in a computing environment;
for each input set of controller parameters that is applied to a controller recurrent neural network:

generate an output set of hyperparameters at the controller recurrent neural network;

apply the output set of hyperparameters to a target recurrent neural network to produce a child recurrent neural network for log anomaly detection with an architecture that is defined by the output set of hyperparameters;

train the child recurrent neural network using the training dataset of logs to classify each of the logs as one of an anomalous log and a non-anomalous log; and compute a log classification accuracy of the child recurrent neural network with respect to correct classification of anomalous logs and non-anomalous logs using the validation dataset of logs; and using a current log classification accuracy of a corresponding child recurrent neural network, adjust at least one of the controller parameters used to generate the corresponding child recurrent neural network to produce a different input set of controller parameters to be applied to the controller recurrent neural network so that a different child recurrent neural network for log anomaly detection with a different architecture can be generated, wherein the child recurrent neural network is a long short term memory (LSTM) recurrent neural network that includes first LSTM cells and wherein the controller recurrent neural network is a LSTM recurrent neural network that includes second LSTM cells.

16. The system of claim 15, wherein the logs in the training and validation datasets relate to operations of a software process running in a cloud computing environment.

17. The system of claim 15, wherein each node in a layer of the controller recurrent neural network is connected with a directed one-way connection to every other node in the next successive layer instead of a two-way connection.

18. The system of claim 15, wherein the hyperparameters include at least one of learning rate, batch size, number of layers and number of long short term memory (LSTM) units per layer.

19. The system of claim 15, wherein each LSTM cell of the target recurrent neural network includes four interacting layers.

20. The system of claim 19, wherein an output $h_t$ of each LSTM cell is computed using $f_t$ generated by a first sigmoid layer, $i_t$ generated by a second sigmoid layer, $\tilde{C}_t$ generated by a tanh layer and of generated by a third sigmoid layer, where $f_t$, $i_t$, $\tilde{C}_t$ and $o_t$ are functions.

* * * * *